United States Patent

Shimizu et al.

[11] Patent Number: 5,847,919
[45] Date of Patent: Dec. 8, 1998

[54] ELECTROLYTIC CAPACITOR WITH CERAMIC COATED CONTACT SURFACE

[75] Inventors: Makoto Shimizu; Hajime Kawada; Hidehiko Itoh, all of Tokyo, Japan

[73] Assignee: Nippon Chemi-Con Corporation, Tokyo, Japan

[21] Appl. No.: 413,508

[22] Filed: Mar. 30, 1995

[30] Foreign Application Priority Data

Sep. 29, 1994 [JP] Japan .................................. 6-235349
Oct. 25, 1994 [JP] Japan .................................. 6-260793

[51] Int. Cl.$^6$ ...................................................... H01G 2/10
[52] U.S. Cl. ............................ 361/517; 361/303; 361/327; 361/504; 361/505; 361/519; 361/520
[58] Field of Search ............................... 361/301.1, 303, 361/503–505, 516–520, 327, 433, 525, 535–538, 502; 29/25.41, 25.03

[56] References Cited

U.S. PATENT DOCUMENTS 3,569,794   3/1971  Carino .
4,024,625   5/1977  England .
4,035,905   7/1977  Clement .
4,538,212   8/1985  Montgomery ........................... 361/433

FOREIGN PATENT DOCUMENTS 01-194408   of 0000   Japan .
02-263425   10/1990   Japan ............................... H01G 9/08
181149      6/1994    Japan .
224078      8/1994    Japan .
244061      9/1994    Japan .

*Primary Examiner*—Leo P. Picard
*Assistant Examiner*—Phuong T. Vu
*Attorney, Agent, or Firm*—Young & Thompson

[57] ABSTRACT

An electrolytic capacitor of the present invention is so constituted that a capacitor element steeped with an electrolytic solution containing quaternary ammonia salts is accommodated in an armor case of which aperture is sealed with a sealing body. To achieve the above object, an external terminal of the electrolytic capacitor has a contact surface contacting with the sealing body and being coated by a ceramic coating layer.

5 Claims, 3 Drawing Sheets

ELECTROLYTIC CAPACITOR WITH CERAMIC COATED CONTACT SURFACE

BACK GROUND OF THE INVENTION

The present invention relates to electrolytic capacitors, and more particularly to an electrolytic capacitor comprising a capacitor element steeped with an electrolytic solution containing quaternary ammonium salt.

Conventional electrolytic capacitors 10 as illustrated in FIGS. 1 and 2 are generally so constituted that a capacitor element 12 comprises laminations of aluminum foils and separate sheets 12c and is connected to external terminals 14 and further accommodated in an armor case 16. The external terminal 14 comprises an aluminum conductor 18 comprising a pole portion 18a and a flat portion 18b, and an external lead 20 connected to the aluminum conductor. The pole portion 18a is constituted to be inserted in and supported with an insertion portion 22a allowing the pole portion to pass therethrough in a sealing body 22 for sealing an aperture of the armor case 16. The capacitor element 12 is steeped with the electrolytic solution containing quaternary ammonium salts.

Another conventional electrolytic capacitor 10 as illustrated in FIG. 3 comprises a capacitor element 12 comprising laminations of cathode aluminum foils 12a, anode aluminum foils 12b and separate sheets 12c, an armor case 16 which accommodates the capacitor element 12, and a sealing plate 22' which seals the armor case 16. The armor case 16 has a caulking part 16b and a curl part 16c which support and seal the sealing plate 22' at a predetermined position. The sealing plate 22' comprises a rubber plate 22b and an insulating plate 22c which are adhered with each other. The sealing plate 22' connects to an external terminal 20' through a rivet 18' fixed on an insertion portion 22a. In electrolytic capacitor 10, capacitor element 12 is connected to rivet 18', which is fixed on sealing body 22', by inner electrode tab 24. The capacitor is readily assembled by placing capacitor element 12 with sealing body 22' in armor case 16.

The external terminal 14 contact surface of electrolytic capacitor 10 of the prior art, especially at the cathode side, contacts either sealing body 22 or pole portion 18a pole portion 18a is inserted into, and supported by, insertion portion 22a. The contact surface tends to show a deterioration in resistance to electrolytic corrosion. Thus, electrical and chemical functions of the electrolytic solution within the insertion portion 22a allow for increase of liquid leakage. In a process of voltage treating (aging process) for manufacturing of the capacitor, a chemical coating film having the electrical and chemical resistance to the electrolytic corrosion is formed, for example, by extending a time of the process appropriately. However, as a voltage is applied to the cathode side in the aging process, a chemical coating cannot be applied to pole position 18a of the cathode. For such electrolytic capacitor 10, the problem with the liquid leakage may be solved by means of a process of producing the special chemical coating on the pole portion 18a at the cathode side.

Regarding the latter type of the electrolytic capacitor 10, a contact surface of the rivet 18' (especially, at the cathode side) contacts with the sealing plate 22' or the contact surface of the rivet 18' is inserted and fixed within the insertion portion 22a. The contact surface tends to show a deterioration in the resistance to the electrolytic corrosion. Therefore, electrical and chemical functions of an electrolytic solution at the insertion portion 22a cause a problem in increase of the liquid leakage. In a process of voltage treating (aging process) for manufacturing of the capacitor, a chemical coating film having an electrical and chemical resistance to the corrosion is formed, for example, by extending the process time appropriately. However, for the pole portion 18a on the cathode side, the chemical coating can not be formed since a voltage is applied to the cathode side in the aging process. For such electrolytic capacitor 10, this problem with the liquid leakage may be solved by producing the special chemical coating on the pole portion 18a at the cathode side.

The former process for producing the additional chemical coating film by a number of complicated steps lead to disadvantages in increase of manufacturing cost and in deterioration in the capacitor quality. Another technology to overcome those disadvantages has been proposed and disclosed in the Japanese Patent Publication No. 60-32346. Namely, at least necessary parts of the external terminals are subjected to a chemical coating prior to a process for manufacturing capacitors in order to eliminate some of a number of complicated process steps and to solve the problems wherein the pole portion is inserted and supported within the insertion portion of the sealing body or a part of the rivet is inserted and fixed within the insertion portion of the sealing plate.

However, the technology of the Japanese Patent Publication has problems that are yet to be solved.

The contact surface of the external terminal, especially at the cathode side contacts with the electrolytic solution containing quaternary ammonium salt. The contact surface is provided with electrical and chemical resistance to the corrosion so that current leakage does not increase by the function of the electrolytic solution. Therefore, an electrolytic capacitor almost free from liquid leakage may be manufactured in a relatively low cost.

Another problem not solved by the prior art is the electrolytic solution's pH increase when the solution contacts a terminal with a chemical coating, especially the contact surface or the pole portion 18a. Thus, the other contact surface contacting with the electrolytic solution, for example, the insertion portion of the sealing body may react with the solution, resulting in deterioration of the capacitor.

This further leads to deterioration in shielding property of the sealing body or the sealing plate, resulting in furthermore deterioration of life performance due to leakage and dry-up of the electrolytic solution. The initial pH value 7 of the electrolytic solution rises up to approximately 10 to 14.

In addition to the terminal contact surface leakage problem these systems also leak from a contact surface 16a of the armor case 16 which in turn contacts sealing body 22. These phenomenon have been overlooked in the past. Namely, in manufacturing the capacitor, the electrolytic solution is adhered to an inside of the armor case when the capacitor element 12 is inserted in the armor case 16. At the next step of mounting the sealing body 22, the adhered electrolytic solution remains on the contact surface 16a contacting with the sealing body 22. Even if the contact surface 16a of the armor case has a chemical coating, a pH value of the adhered electrolytic solution rises in the same way of the contact surface 18a of the terminal. Thus, the contact surface of the armor case deteriorates and subsequently the shielding property drops, resulting in the leakage of the electrolytic solution.

SUMMARY OF THE INVENTION

It is therefore an object of the invention to provide an electrolytic capacitor free from leakage and dry-up of the electrolytic solution and being manufactured in a relatively low cost.

An electrolytic capacitor of the present invention is so constituted that a capacitor element steeped with an electrolytic solution containing quaternary ammonia salts is accommodated in an armor case of which aperture is sealed with a sealing body. To achieve the above object, an external terminal of the electrolytic capacitor has a contact surface contacting with the sealing body and being coated by a ceramic coating layer.

The external terminal is made of an aluminum conductor and comprising a pole portion and a plate portion. It is preferable that a ceramic coating layer is formed on the pole portion prior to a manufacturing process of the capacitor.

Instead of or in addition to the above mentioned contact surface of the external terminal, the armor case may have a contact surface contacting with the sealing body and being provided with a further ceramic coating layer.

It is also preferable that the ceramic coating layer is formed on the contact surface of the armor case contacting with the sealing body prior to the manufacturing process of the capacitor.

In the above mentioned capacitor, a rivet for connecting an inner electrode tab to an external terminal may have a contact surface contacting with the sealing body on which a furthermore ceramic coating layer is formed.

It is preferable to form additional ceramic coating layer on a surface of the inner electrode tab of the capacitor element.

BRIEF DESCRIPTION OF THE DRAWINGS

Preferred embodiments of the present invention will hereinafter be described in detail with reference to the accompanying drawings.

PREFERRED EMBODIMENTS OF THE INVENTION

When an electrolytic solution containing quaternary ammonium salts contacts with an external terminal of aluminum conductor or an armor case, a ceramic coating layer may provide the external terminal or the armor case with an electrical and chemical resistance to corrosion for preventing a current leakage and may form an insulation film against the electrolytic solution for preventing any change of property thereof. Namely, leakage and dry-up of the electrolytic solution by a deterioration of a sealing body of plate due to an increase of a pH value of the electrolytic solution can be prevented. In addition, such kind of electrolytic capacitors may be manufactured in a relatively low cost, since the coating layer is formed prior to a manufacturing process of the capacitor. With an additional coating technology for both contact surfaces of the armor case and the terminals, the capacitor may prevent any leakage of the electrolytic solution entirely and prevent dry-up effectively.

Figure 1:
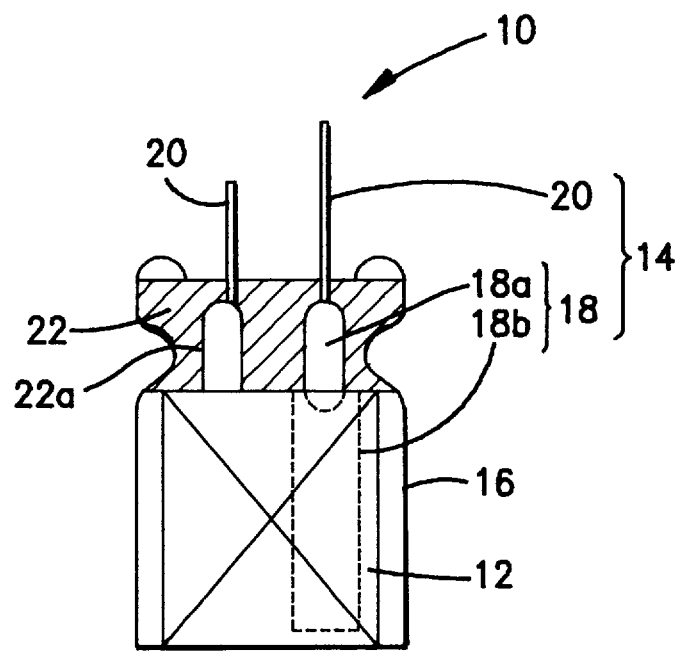
FIG. 1 is a sectioned view illustrating a general structure of an electrolytic capacitor.
Figure 2:
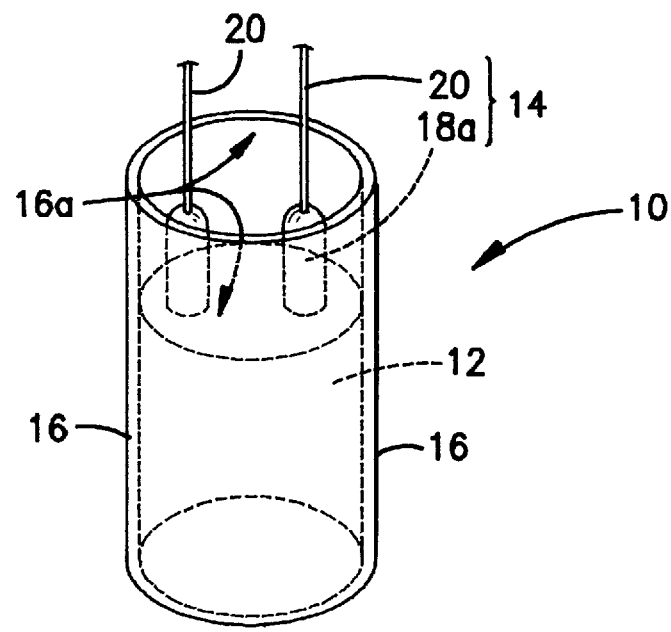
FIG. 2 is a perspective view of an armor case, in which a capacitor element is inserted, for an electrolytic capacitor.

A basic structure of an electrolytic capacitor of the invention is the same as the applicant admitted prior art. In FIG. 1, an electrolytic capacitor 10 comprises external terminals 14 and a capacitor element 12 connected to the terminals 14, which is accommodated in an armor case 16. The external terminal 14 comprises an aluminum conductor 18 usually comprising a pole portion 18a and a plate portion 18b, and an external lead 20 connected to a conductor 18.

The pole portion 18a is inserted and supported within an insertion portion 22a of a sealing body 22 which seals an aperture of the armor case 16. The capacitor element 12 is filled with an electrolytic solution containing quaternary ammonia salts.

Figure 4:
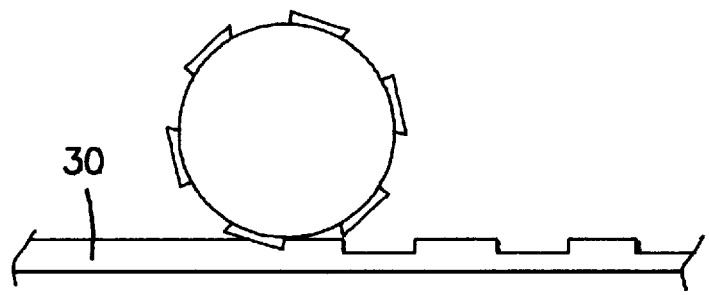
FIG. 4 is a side elevation view illustrative of a press working of aluminum conductor as an external terminal.
Figure 5:
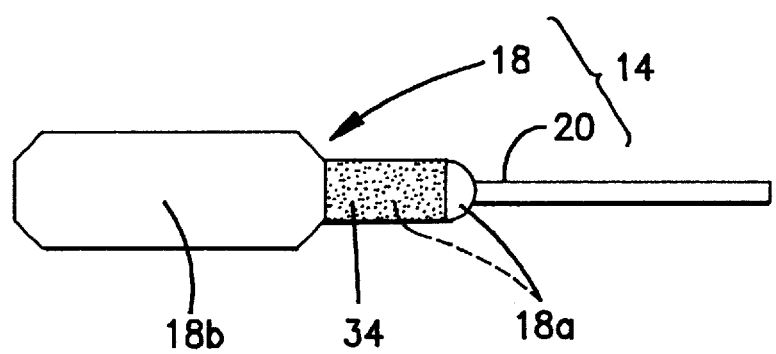
FIG. 5 is a side elevation view illustrative of an external terminal of the electrolytic capacitor according to the present invention.
Figure 6:
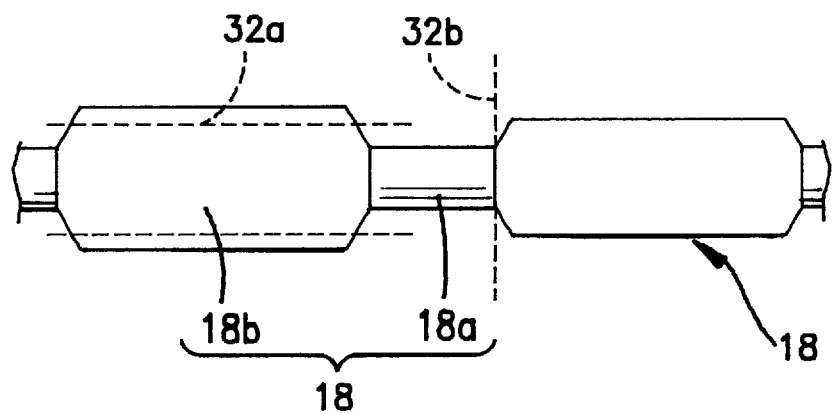
FIG. 6 is a top view illustrating a process of cutting the aluminum conductor shown in FIG. 4.

In this embodiment, as shown in FIGS. 4 or 5, an aluminum wire rod 30 is pressed intermittently and then cut at predetermined sizes 32a and 32b illustrated in FIG. 6 for the pole portion 18a and the plate portion 18b forming the aluminum conductor 18 to be subjected to a ceramic coating prior to the manufacturing process. Namely, the aluminum conductor 18 is steeped in a liquid containing a coating agent of metal alcoxide ceramics containing $Al_2O_3$ or $SiO_2$, for a heat treatment at 100° C. for 30 minutes and subsequent steeping into the liquid prior to a further heat treatment at 100° C. for 60 minutes before a coating layer is then formed on the aluminum conductor 18.

Finally, the external lead of CP wire is welded to an edge side of the pole portion 18a to form the external terminal 14 (FIG. 5). It is available that the whole part of the external terminal 14 is subjected to a ceramic coating in place of the aluminum conductor 18. A manufacturing process of the capacitor using those external terminals 14 is the same as the prior art. A description thereof will be omitted.

According to this embodiment, the insertion and supporting part for the sealing body to the external terminals, namely, contacting with the electrolytic solution is provided with an electrical and chemical resistance to the corrosion for the external terminals and with a ceramic coating layer serving as an insulator from the electrolytic solution for preventing any change of property thereof. The electrolytic capacitor may prevent any leakage and dry-up of the electrolytic solution, by decrease in shielding property of the sealing body due to electrical and chemical functions. In addition, the electrolytic capacitor can be manufactured in a relatively low cost since the coating layer is formed prior to a process for manufacturing the capacitor.

Figure 7:
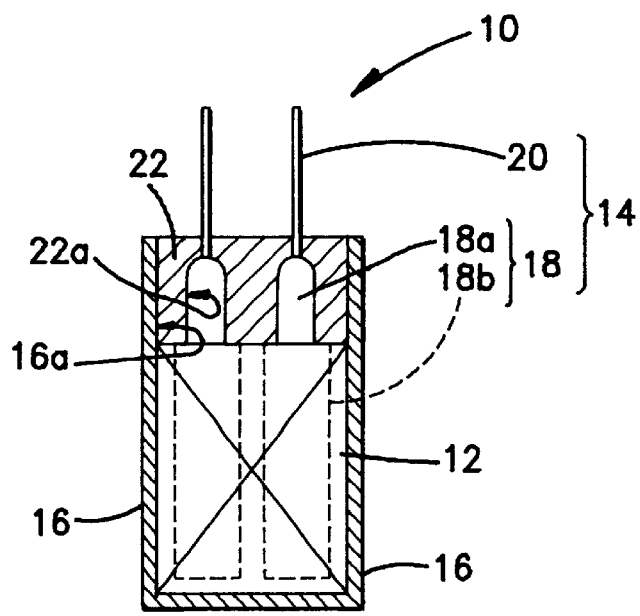
FIG. 7 is a vertical sectioned view illustrative of a principal part of the armor case of FIG. 2 wherein an aperture thereof is sealed with a sealing body.

FIG. 7 illustrates another embodiment of an electrolytic capacitor according to the present invention. The electrolytic capacitor of this embodiment has the same structural part as the foregoing embodiment. Description of the same structural parts will be omitted.

In the embodiment as shown in FIG. 7, a contact surface 16a of the armor case 16 contacting with the sealing body 22 is subjected to a ceramic coating prior to the process for manufacturing the capacitor. Namely, the contact surface 16a is steeped in a liquid containing a coating agent of metal alcoxide ceramics containing, for example, $Al_2O_3$ or $SiO_2$, for a heat treatment at 100° C. for 30 minutes and subsequent steeping into the liquid prior to a further heat treatment at 100° C. for 60 minutes before a coating layer is then formed on the contact surface 16a. In this embodiment, a manufacturing process of the capacitor is the same as the prior art. Descriptions thereof will be omitted.

According to this embodiment, the contact surface of the armor case contacting with the sealing body, namely, contacting with the adhered electrolytic solution in assembling the capacitor, is provided with an electrical and chemical resistance to the corrosion for the armor case and with a ceramic coating layer serving as an insulator from the electrolytic solution for preventing any change of property thereof. The electrolytic capacitor may prevent any leakage of the electrolytic solution from the contact surface of the armor case, by an electrical and chemical shielding deterioration of the sealing body. In this case, an amount of the adhered solution is reduced considerably by forming the coating layer, resulting in a further reduction of the liquid leakage. In addition, such an electrolytic capacitor may be manufactured in a relatively low cost since the coating layer is formed prior to a process for manufacturing the capacitor. With an additional coating technology for both contact surfaces of the armor case and the terminals respectively mentioned above, the capacitor may prevent any liquid leakage from an entire of the capacitor and dry-up effectively.

Figure 3:
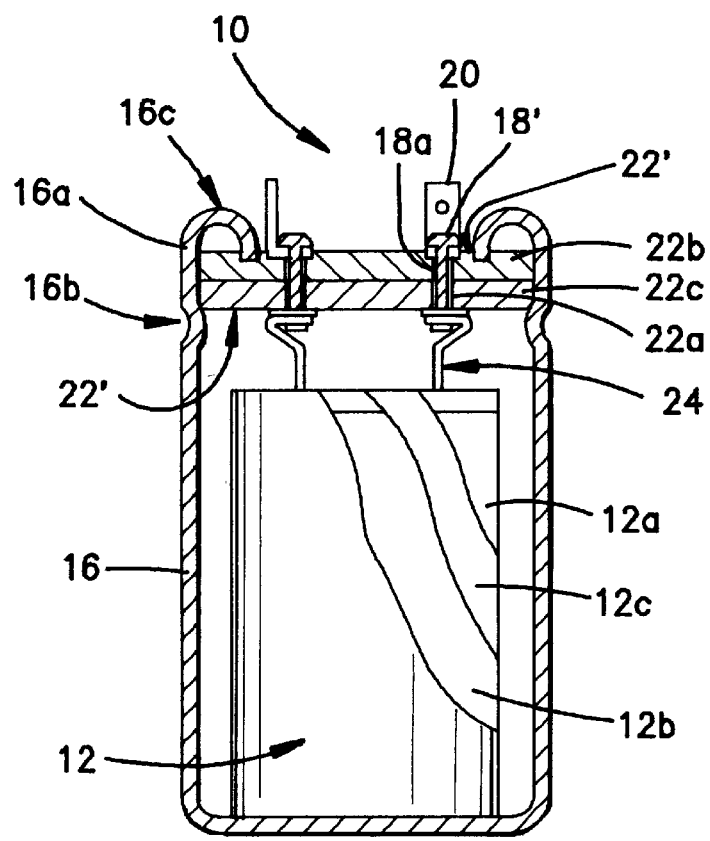
FIG. 3 is a sectional view showing another embodiment of the electrolytic capacitor.

Referring to FIG. 3 the electrolytic capacitor of this embodiment has the same structural part as the foregoing embodiment. Description of the same structural parts will be omitted.

An electrolytic capacitor 10 comprises a capacitor element 12, an armor case 16 which accommodates the capacitor element 12 and a sealing plate 22' which seals the armor case. The sealing plate 22' comprises a rubber plate 22b and an insulating plate 22c both of which are adhered with each other and further the plate 22' is so constituted as to connect through a rivet 18' fixed in the insertion portion 22a within the plate to an external terminal 20' and an inner electrode tab 24 within the capacitor element 12. Needless to say, the capacitor element 12 is filled with the electrolytic solution containing quaternary ammonia salts.

In this embodiment, the rivet 18' for connecting the inner electrode tab 24 with the external terminal 20' has a contact surface contacting with the insertion portion 22a within the sealing plate 22'. The surface of the inner electrode tab 24 are coated with ceramics prior to the manufacturing process. Namely, the rivet 18' of aluminum conductor and the inner electrode tab 24 are steeped in a liquid containing a coating agent of metal alcoxide ceramics containing, $Al_2O_3$ or $SiO_2$, for a heat treatment at 100° C. for 30 minutes and subsequent steeping into the liquid prior to a further heat treatment at 100° C. for 60 minutes before a coating layer is then formed on the surfaces. In this embodiment, a manufacturing process of the capacitor is the same as the prior art. Descriptions thereof will be omitted.

According to this embodiment, the contact surface of the external terminal or the rivet contacting with the sealing body 22' and the surface of the inner electrode tab or the both surfaces contacting with the electrolytic solution are provided with an electrical and chemical resistance to the corrosion for both parts and with a ceramic coating layer serving as an insulator from the electrolytic solution for preventing a change of property (an increase in pH value). The electrolytic capacitor may prevent any leakage and dry-up of the electrolytic solution by an electrical and chemical shielding deterioration of the sealing body. In addition, the electrolytic capacitor may be manufactured in a relatively low cost since the coating layer is formed prior to a process for manufacturing the capacitor.

In each embodiment mentioned above, such materials as $TiO_2$, MgO, $SiZrO_4$, $H_2BO_3$, $ZrO_2$ and $Cr_2O_3$ may be used as ceramic coating agent instead of $Al_2O_3$ or $SiO_2$.

Results of experiments comparing each of the electrolytic capacitors in the above embodiments with the prior art are shown in Table 1.

The examples 1 and 2 show the results using the electrolytic capacitor as illustrated in FIG. 1, having rating of 25V and 82 μF, electrolytic solution A; monotetramethylammoniumphthalate of 20 wt %, γ-butyrolactone solution, electrolytic solution B; triethylmethylammonium maleic acid of 20 wt %, γ-butyrolactone solution. The results were obtained by observing leakage of the electrolytic solution, after rated voltage (25V) was applied to the electrolytic capacitor at 105° C. for 2000 hours.

The comparative examples 1 and 2 show the results of using the electrolytic capacitor wherein external terminals have no ceramic coating layer. The results were obtained by observing leakage of the electrolytic solution under the same condition as the examples 1 and 2.

The example 3 shows the result using the electrolytic capacitor as illustrated in FIG. 7, having rating of 10V and 1500 μF, electrolytic solution A; monotetramethylammoniumphthalate of 20 wt %, γ-butyrolactone solution. The result was obtained by observing liquid leakage from the contact surface of the armor case of the electrolytic solution, after rated voltage (10V) was applied to the electrolytic capacitor at 105° C. for 2000 hours.

The comparative example 3 shows the result of using the electrolytic capacitor wherein the armor case has ceramic coating layer. The result was obtained by observing leakage of the electrolytic solution under the same condition as the example 3.

The example 4 shows the result using the electrolytic capacitor as illustrated in FIG. 3, having rating of 10V and 27000 μF (dimension of the capacitor is 22φ×501), electrolytic solution A; monotetramethylammonium phthalate of 20 wt %, γ-butyrolactone solution. The result was obtained by observing liquid leakage of the electrolytic solution, after rated voltage (10V) was applied to the electrolytic capacitor at 85° C. for 3000 hours.

The comparative example 4 shows the result of using the electrolytic capacitor wherein the external terminals and the inner electrode tabs have no ceramic coating layer. The result was obtained by observing leakage of the electrolytic solution under the same condition as the example 4.

TABLE 1

| No. | Electrolytic solution | The number of occurrence of leakage |
| --- | --- | --- |
| Embodiment 1 | A | 0/20 |
| Comparative Example 1 | A | 14/20 |
| Embodiment 2 | B | 0/20 |
| Comparative Example 2 | B | 3/20 |
| Embodiment 3 | A | 0/50 |
| Comparative Example 3 | A | 7/50 |
| Embodiment 4 | A | 0/20 |
| Comparative Example 4 | A | 5/20 |

The following results were obtained. In the examples 1 and 2 of the present invention, no liquid leakage occurred, while a leakage thereof occurred in the comparative example 2 and particularly in the comparative example 1.

In the example 3 of the present invention, no liquid leakage occurred, while a leakage thereof occurred in the comparative example 3.

In the example 4 of the present invention, no liquid leakage occurred, while a leakage thereof occurred in the comparative example 4.

As mentioned above, the electrolytic capacitors of the present invention comprise the capacitor element steeped with the electrolytic solution, which is accommodated in the armor case whose aperture is sealed with the sealing body. The contact surface of the external terminal contacting with the sealing body is covered with the ceramic coating layer. The contact surface of the external terminal contacting with the electrolytic solution is provided with an electrical and chemical resistance to the corrosion for the external terminal and with a ceramic coating layer serving as an insulator from the electrolytic solution for preventing any property change. The capacitor may effectively be free from any leakage and dry-up of the electrolytic solution, due to the electrical and chemical shielding deterioration of the sealing body or the sealing plate.

The contact surface of the armor case contacting with the sealing body is provided with the electrical and chemical resistance to the corrosion for preventing the liquid leakage from the contact surface effectively.

In addition, the electrolytic capacitor may be manufactured in a relatively low cost since the coating layer is formed prior to the process for manufacturing the capacitor.

What is claimed is:

1. An electrolytic capacitor comprising: a capacitor element steeped with an electrolytic solution containing quaternary ammonia salts, said capacitor element being accommodated in an armor case having an aperture sealed with a sealing body, wherein said armor case has a contact surface contacting with said sealing body and being coated by a metallic alkoxide ceramic coating layer, said coating layer being effective to prevent i) the pH of said electrolytic solution from rising and ii) said electrolytic solution corroding said armor case.

2. The method of making the electrolytic capacitor of claim 1, wherein said ceramic coating layer is formed prior to a manufacturing process of the capacitor.

3. An electrolytic capacitor comprising: a capacitor element steeped with an electrolytic solution containing quaternary ammonia salts, said capacitor element being accommodated in an armor case having an aperture sealed with a sealing body, wherein both an external terminal of said electrolytic capacitor and said armor case have respectively contact surfaces contacting with said sealing body and being coated by metallic alkoxide ceramic coating layers, said coating layer being effective to prevent i) the pH of said electrolytic solution from rising and ii) said electrolytic solution corroding said terminal and said armor case.

4. An electrolytic capacitor comprising a capacitor element steeped with an electrolytic solution containing quaternary ammonia salts, said capacitor element being accommodated in an armor case having an aperture sealed with a sealing body, each of paired external terminals as a cathode and an anode of said electrolytic capacitor being made of aluminum and comprising a plate-shaped portion, and pole portion unitarily formed with said plate-shaped portion, and an external lead connected to said pole portion, said pole portion being in contact with said sealing body, wherein said pole portion of said terminal acting as the cathode is coated with a metallic alkoxide ceramic coating layer which prevents electro-chemical change in composition of said electrolytic solution to suppress rising of the pH of said electrolytic solution in the vicinity of said cathode and also suppress corroding of said cathode.

5. An electrolytic capacitor comprising a capacitor element steeped with an electrolytic solution containing quaternary ammonia salts, said capacitor element being accommodated in an armor case having an aperture sealed with a sealing body, each of paired internal tabs as a cathode and an anode being made of aluminum and connected with an external lead, each of said tabs having a projecting part projected from said capacitor element, wherein only said projection part of said tab as the cathode is coated with a metallic alkoxide ceramic coating layer which prevents electro-chemical change in composition of said electrolytic solution to suppress rising of the pH of said electrolytic solution in the vicinity of said cathode and also suppress corroding of said tab.

\* \* \* \* \*